UNITED STATES PATENT OFFICE.

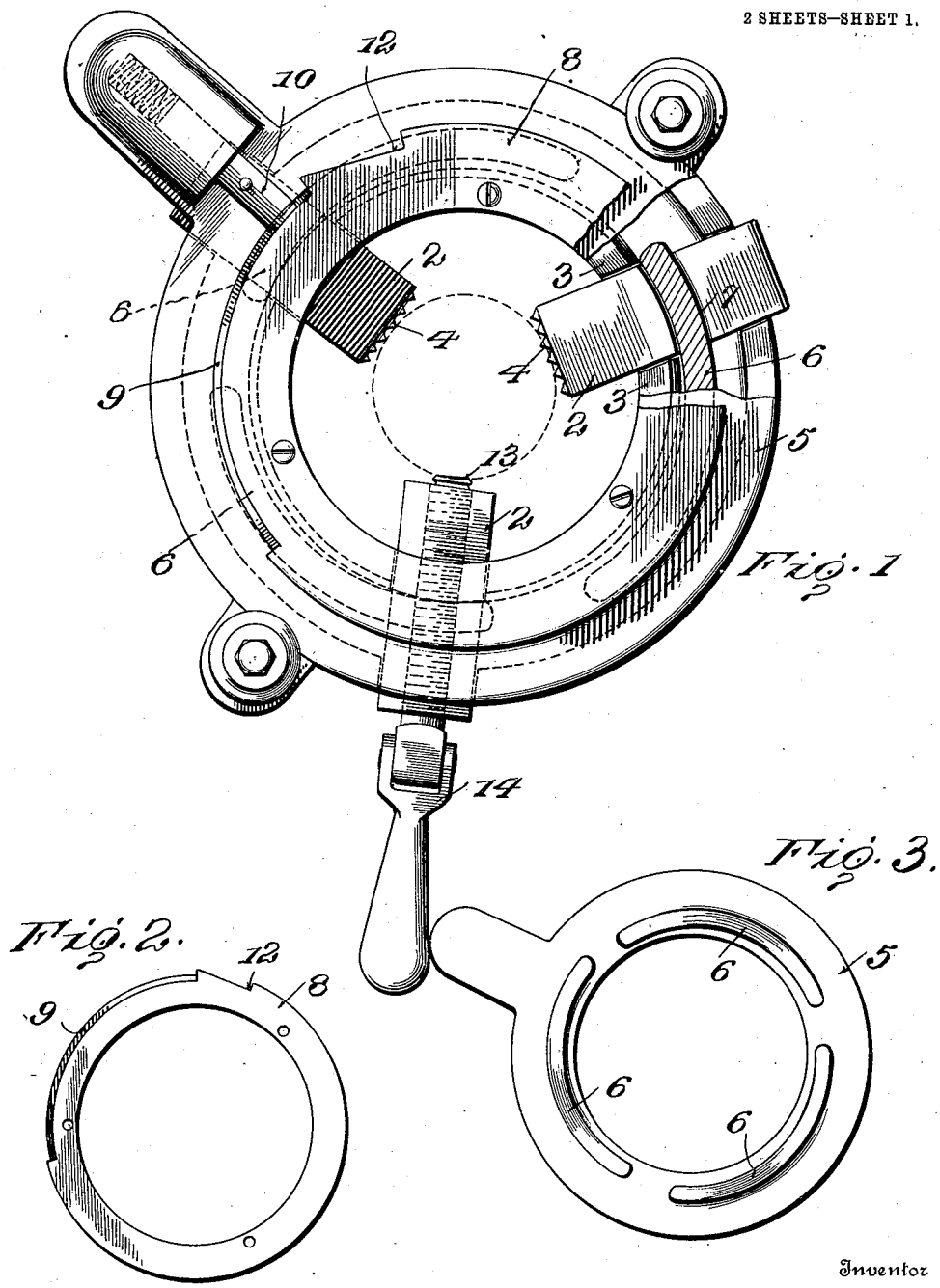

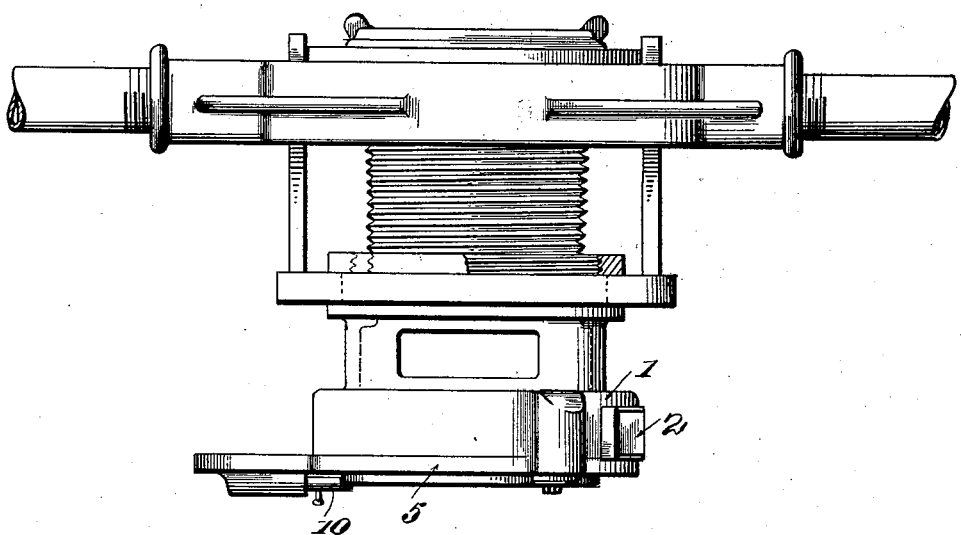
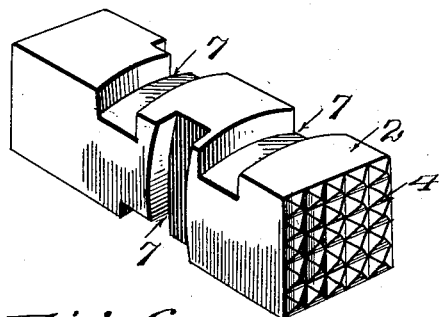
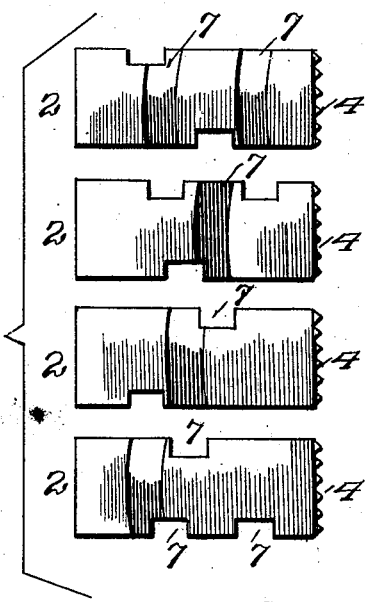

MILTON W. BECHTEL, OF WARREN, OHIO, ASSIGNOR TO THE BORDEN COMPANY, OF WARREN, OHIO, A CORPORATION OF OHIO.

WORK-HOLDER FOR PIPE-THREADING TOOLS.

1,007,635.  Specification of Letters Patent.  Patented Oct. 31, 1911.

Application filed June 14, 1909, Serial No. 502,107. Renewed June 18, 1910. Serial No. 567,685.

*To all whom it may concern:*

Be it known that I, MILTON W. BECHTEL, of Warren, in the county of Trumbull and State of Ohio, have invented certain new and useful Improvements in Work-Holders for Pipe-Threading Tools; and I do hereby declare the following to be a full, clear, and exact description of the invention, such as will enable others skilled in the art to which it appertains to make and use the same.

Heretofore it has been customary, in connection with the threading of pipes by hand tools, to center the pipes—of all sizes within the capacity of the tool—by a series of bushings, one for each size of pipe, and a series of clamping screws threaded through the work holder casing and the bushings so that they may be screwed against the pipes which are to be threaded. These bushings do not in themselves accurately center the pipes in line with the dies or chasers, since they must of necessity be made loose enough to allow for variations in the outside diameters of rough pipes, and also to pass over the burs thrown up in cutting off the pipes with a wheel cutter, the means commonly employed with hand tools. The employment of a series of bushings is also objectionable in that it involves the use of several loose parts, some of which are liable to be lost or mislaid. Grip or clamping screws are also objectionable because of the difficulty in turning them up to accurately center the pipes and take up the looseness allowed in the bushings. Furthermore, these screws are liable to break or bend under the strain of threading the pipes, especially when they are projected well into the work holder.

The primary object of the present invention is to overcome all these objections, and to provide in a single work holder means for accurately and firmly centering all pipes within the capacity of the threading tool to which the work holder is attached.

The invention will be hereinafter fully set forth and particularly pointed out in the claims.

In the accompanying drawings, Figure 1 is an end elevation of a work holder constructed in accordance with my invention. Fig. 2 is a view of the retaining plate. Fig. 3 is an inner face view of the cam plate. Fig. 4 is a view in side elevation of a threading tool, conventionally indicated, with my improvements applied thereto. Fig. 5 shows the different sides of a single pipe engaging jaw. Fig. 6 is a view in perspective of one of the jaws.

Referring to the drawings, 1 designates the casing of a work holder which may be employed in connection with various styles of threading tools and to which it may be attached by any suitable means. This casing, at what is ordinarily regarded as its rear end, has a housing wherein are formed radial guideways for a series of pipe engaging jaws 2. I have shown three jaws, but a different number may be used if desired. This housing has a central opening, as is customary, to accommodate pipes of different sizes, and adjacent to such opening the housing has a series of flanges 3 between the several guideways.

Each pipe-engaging jaw is square in cross section, and at its inner end is preferably formed with teeth 4 for biting into the surface of a pipe. These jaws are moved inward and outward by the axial turning of a plate 5 rotatably mounted on the housing and encircling the flanges 3. This plate on its inner face has a series of eccentric ribs 6 which take in grooves cut transversely in the outer faces of the pipe engaging jaws. These eccentric ribs are what are ordinarily termed "slow-acting", that is to say, they have but little eccentricity, the object being to avoid axial rotation of the plate by pressure longitudinally of the jaws. In consequence, no matter how great the outward thrust may be the plate will not be rotated thereby, and hence it is unnecessary to employ means to lock or otherwise fasten the plate in its adjusted position. There is, of course, sufficient eccentricity in the cam ribs to obtain what adjustment is necessary for variations in pipes of the same size, so that the jaws are always capable of being moved a short distance either inward or outward.

To enable the same jaws or pipe engaging members to be used for pipes of different sizes, I form at different points in each of the four sides of each jaw a transverse groove 7. In some instances I form two grooves in the same side or face of a jaw, but ordinarily the requirements of the tool are subserved by the formation of a single groove in each face. The several sides of the jaws are numbered as a matter of convenience, and may also be marked to indicate the diameters of the various pipes for which the tool may be used. The adjusting plate may be readily turned to effect the slight movement of the jaws, but when the plate is moved to an extent to disengage the eccentric ribs from the jaws the latter may be readily withdrawn from the housing. For this purpose spaces are left between the ends of the several ribs.

The jaw adjusting plate 5 is held in position by a ring-like plate 8 secured by screws, or otherwise, to flanges 3. In the periphery of this plate is formed a groove or cut-out 9 into which projects a spring-pressed pin 10 on the handled portion of the cam plate. By contacting with the ends of this groove or cut out, the pin limits the axial rotation of the cam plate within the range of the several ribs. When, however, it is desired, to free the jaws from the ribs, to enable them to be withdrawn and repositioned for a pipe of different size from that previously operated upon, the pin 10 is drawn outward a short distance and the plate turned or rotated until the pin is opposite the second groove or cut out 12. Then the jaws may be withdrawn by being moved longitudinally, and after being turned axially may be replaced and reëngaged by the ribs of the cam plate which will hold the jaws farther toward or away from the center of the work holder according to the location of the rib-receiving grooves in the jaws.

I have shown one of the clamping jaws as having a threaded bore to accommodate a central screw 13 carrying a pivoted handle 14. This screw may be caused to bind against the pipe as an additional safe-guard. It may be also employed to throw the pipe off center as when it is desired to cut a crooked or pitched thread.

The advantages of my invention are apparent. By forming the jaw adjusting plate with slow cams it is not necessary to lock such plate, since longitudinal pressure on such jaws cannot possibly effect any shifting of such plate. I am enabled to do this because of the fact that the adaptation of the work holder to pipes of different sizes is not dependent upon moving the jaws inward or outward, beyond the slight extent required for binding and releasing each pipe. One set of jaws may be used for all sizes of pipe within the range of the tool, and in each instance to which the jaws may be adjusted by the cam plate is the same.

I claim as my invention:—

1. A work holder comprising a housing having a series of radial guideways, a series of pipe clamping jaws movable in said guideways, each jaw having pipe engaging surfaces on one end and provided with a transverse groove in each of its several sides but at different distances from the pipe engaging end thereof, and a plate rotatably mounted on said housing and having a series of eccentric ribs fitted in said grooves.

2. A work holder comprising a housing having a series of radial guideways, a series of pipe clamping jaws having pipe engaging surfaces on one end movable in said guideways, each jaw having grooves in a plurality of its sides, such grooves being located different distances from the pipe engaging end a plate rotatably mounted on the housing having a sedies of eccentric ribs for taking in said grooves, spaces being formed between the contiguous ends of adjacent ribs, means for normally limiting the rotation of such plate to insure engagement between the ribs and the jaws, and means for permitting such plate to be additionally rotated to free said jaws of said ribs so that the former may be withdrawn from and repositioned in the housing without removing said plate.

3. A work holder comprising a housing having a series of radial guideways, a series of pipe clamping jaws movable in said guideways, each jaw having pipe engaging surfaces on one end and having grooves in a plurality of its sides, such grooves being located different distances from the pipe engaging end of the jaw, a plate rotatably mounted on the housing having a series of eccentric ribs for taking in said grooves, spaces being formed between the contiguous ends of adjacent ribs, a plate fixed to said housing and having a cut out, and a spring-pressed pin carried by said rotatable plate fitting in said cut-out to limit the movements of said rotatable plate.

In testimony whereof, I have signed this specification in the presence of two subscribing witnesses.

MILTON W. BECHTEL.

Witnesses:
GRANDON MORAN,
A. J. SUTCLIFFE.

Copies of this patent may be obtained for five cents each, by addressing the "Commissioner of Patents, Washington, D. C."